US010073751B2

(12) United States Patent
Arroyo et al.

(10) Patent No.: US 10,073,751 B2
(45) Date of Patent: *Sep. 11, 2018

(54) DETERMINING CABLE CONNECTIONS IN A MULTI-CABLE LINK

(71) Applicant: International Business Machines Corporation, Armonk, NY (US)

(72) Inventors: Jesse P. Arroyo, Rochester, MN (US); Christopher J. Engel, Rochester, MN (US); Kaveh Naderi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/946,828

(22) Filed: Nov. 20, 2015

(65) Prior Publication Data

US 2017/0147463 A1  May 25, 2017

(51) Int. Cl.
G06F 3/00 (2006.01)
G06F 11/30 (2006.01)
G06F 11/22 (2006.01)
G06F 13/36 (2006.01)
G06F 13/42 (2006.01)

(52) U.S. Cl.
CPC ...... G06F 11/3051 (2013.01); G06F 11/2289 (2013.01); G06F 13/36 (2013.01); G06F 13/4208 (2013.01)

(58) Field of Classification Search
CPC ... G06F 11/3051; G06F 11/2289; G06F 11/00
USPC .................................................... 710/16–18
See application file for complete search history.

(56) References Cited

U.S. PATENT DOCUMENTS 6,023,587 A   2/2000  Watts, Jr. et al.
6,639,895 B1  10/2003  Helles et al.
7,360,954 B1  4/2008  Seaver et al.
(Continued)

FOREIGN PATENT DOCUMENTS

WO  2009137418 A1  11/2009

OTHER PUBLICATIONS

Martin, Fred and Adams, Darryl. "Cross Channel Dependency Requirements of the Multi-Path Redundant Avionics Suite." Aerospace and Electronics Conference, 1992. NAECON 1992., Proceedings of the IEEE 1992 National. pp. 200-206. (Year: 1992).*

(Continued)

*Primary Examiner* — Farley Abad
*Assistant Examiner* — Henry W Yu
(74) *Attorney, Agent, or Firm* — Nolan M. Lawrence

(57) ABSTRACT

A method for determining cable connections identifies a plurality of cables connected to a link included in a first device. The method identifies a first cable connected to the link included in the first device. The method determines that a second cable connected to is connected to a link included in a second device The method further determines that only one of an inbound and an outbound channel of a signaling lane included in the first cable is operable. The method utilizes a second cable to perform one of disabling signal transmission or detecting loss of signal on the operable channel. The method enables and disables signal transmission on the operable channel to determine that the first cable is connected to the link included in the remote device.

8 Claims, 5 Drawing Sheets

(56) References Cited

U.S. PATENT DOCUMENTS

| | | | |
|---|---|---|---|
| 7,520,321 B2* | 4/2009 | Hiron | E21B 47/12 166/65.1 |
| 7,694,029 B2* | 4/2010 | Kubo | H04L 41/0866 710/10 |
| 8,402,189 B2 | 3/2013 | Koga et al. | |
| 2003/0021580 A1 | 1/2003 | Matthews | |
| 2004/0017806 A1 | 1/2004 | Yazdy et al. | |
| 2007/0280239 A1* | 12/2007 | Lund | H04L 45/04 370/392 |
| 2009/0279889 A1 | 11/2009 | Kirkpatrick et al. | |
| 2010/0237904 A1 | 9/2010 | Shau | |
| 2011/0283037 A1 | 11/2011 | Koga et al. | |
| 2012/0079139 A1 | 3/2012 | Sonokawa et al. | |
| 2012/0099427 A1* | 4/2012 | Huang | H04L 12/40169 370/228 |
| 2012/0229159 A1* | 9/2012 | Kim | G01R 31/2889 324/756.07 |
| 2013/0080678 A1 | 3/2013 | Buckland et al. | |
| 2013/0129360 A1 | 5/2013 | Zbinden et al. | |
| 2013/0204987 A1 | 8/2013 | Patani et al. | |
| 2014/0173155 A1 | 6/2014 | Slattery | |
| 2014/0173156 A1 | 6/2014 | Alshinnawi et al. | |
| 2014/0351654 A1 | 11/2014 | Zhang et al. | |
| 2016/0013948 A1 | 1/2016 | Moses | |

OTHER PUBLICATIONS

Arroyo, J. et al., "Determining Cable Connections in a Multi-Cable Link," U.S. Appl. No. 15/249,514, filed Aug. 29, 2016.

U.S. Appl. No. 15/249,514, Accelerated Examination Support Document, dated Aug. 18, 2018, 9 pages.

IBM, List of IBM Patents or Patent Applications Treated as Related, Aug. 26, 2016, 2 pages.

Arroyo, J. et al., "Determining Cable Connections in a Multi-Cable Link," U.S. Appl. No. 15/139,383, filed Apr. 27, 2016.

U.S. Appl. No. 15/139,383, Accelerated Examination Support Document, dated Apr. 18, 2016, 22 pages.

List of IBM Patents or Patent Applications Treated as Related, Apr. 26, 2016, 2 pages.

Engel et al., "PHYP MEX Programming Guide," version 4.1, Mar. 17, 2014, pp. 1-77.

Unknown, "Cable Management," Tier-Based Miscabling Detection, Cisco Dynamic Fabric Automation Configuration Guide, pp. 1-8.

Buckland, P. et al., "Implementing Sideband Control Structure for PCIE Cable Cards and IO Expansion Enclosures," U.S. Appl. No. 14/243,999, filed Apr. 3, 2014.

Buckland, P. et al., "Implementing Sideband Control Structure for PCIE Cable Cards and IO Expansion Enclosures," U.S. Appl. No. 14/628,203, filed Feb. 20, 2015.

Arroyo, J. et al., "Detecting and Configuring of External IO Enclosure," U.S. Appl. No. 14/549,912, filed Nov. 21, 2014.

Arroyo, J. et al., "Detecting and Sparing of Optical PCIE Cable Channel Attached IO Drawer," U.S. Appl. No. 14/549,957, filed Nov. 21, 2014.

Arroyo, J. et al., "Detecting and Sparing of Optical PCIE Cable Channel Attached IO Drawer," U.S. Appl. No. 14/866,931, filed Nov. 21, 2014.

Arroyo, J. et al., "Determining Cable Connections in a Multi-Cable Link," U.S. Appl. No. 14/946,836, filed Nov. 20, 2015.

List of IBM Patents or Patent Applications Treated as Related, signed Nov. 13, 2015, 2 pages.

* cited by examiner

DETERMINING CABLE CONNECTIONS IN A MULTI-CABLE LINK

BACKGROUND

The present invention relates to coupling computing devices using multi-cable links, and more specifically to determining that all cables forming a particular link connect to the same link location on each of the computing devices.

SUMMARY

Aspects of the present disclosure include a method for determining cable connections between a first device and a second device. The method includes determining that a first cable is connected to a first device, and that the first cable includes a signaling lane. The signaling lane includes an outbound channel and an inbound channel. The method determines that only the inbound or the outbound channel is operable, and further determines which of the channels is operable.

The method further includes determining that a second cable is connected to the first device, and that the second cable is also connected to the second device. According to features of the method, signal transmission is disabled on the operable channel of the signaling lane of the first cable. Loss of signal transmission on the operable channel is then detected. According to aspects of the method, one of disabling signal transmission and detecting loss of signal transmission is performed using the second cable. Based on disabling signal transmission and detecting loss of signal, and using the second cable to either disable transmission or to detect loss of signal, an embodiment of the method determines that the first cable is connected to the second device.

In other aspects of the disclosure, a system for determining cable connections between a first and a second device includes the two devices and a processor in communication with the first device. The system is configured to perform features of the method. A computer program product may instruct a computer to perform features of the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
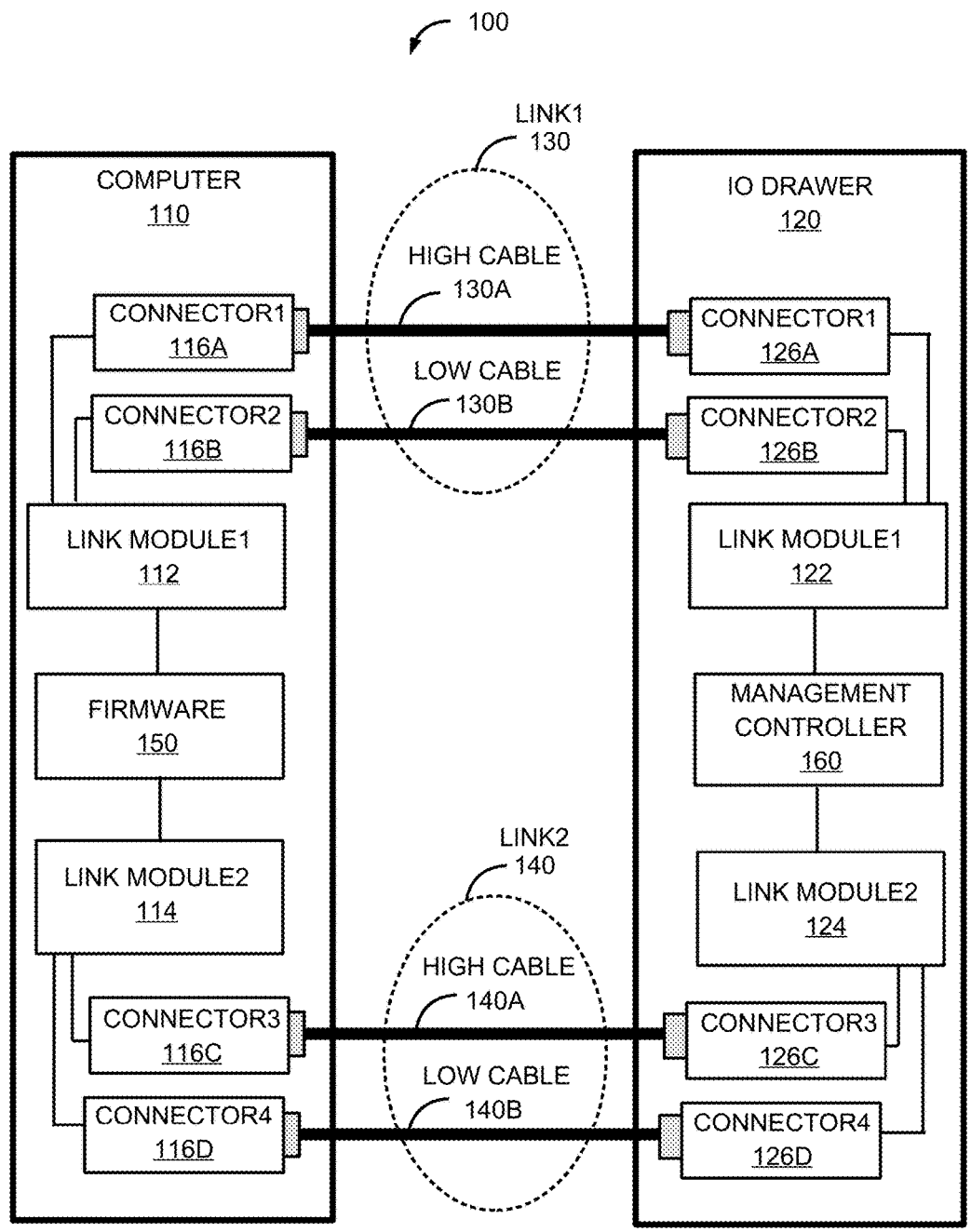
FIG. 1 is a block diagram illustrating a system having devices connected by multi-cable links, according to aspects of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic signaling links formed of multiple cables, more particular aspects relate to determining connections between devices using cables forming a single link. While the present disclosure is not necessarily limited to such applications, various aspects of the disclosure may be appreciated through a discussion of various examples using this context.

In computing systems a signaling link may connect components of a computer (e.g., processors and/or memory) to IO devices, or to IO slots that may plug IO devices. For example, a PCI-Express (PCIE) link may be used to connect components of a computer to a PCIE device (e.g., a PCIE switch or an IO adapter) or a PCIE slot that may plug a PCIE IO adapter. Other example signaling links include SCSI, SAS, SATA, Fiber Channel, and similar IO buses interconnecting processors and memories in a computer to peripheral IO devices.

Signaling links may be formed of signaling "lanes", each lane carrying one bit of information forming a multi-bit datum, such as a byte of data. For example, a PCIE link may be eight or sixteen lanes in width, carrying, respectively, eight or sixteen bits of data. A signaling lane may include an outbound and an inbound channel, in which the outbound channel conveys signals, or data, from a link element in a first device (e.g., a computer) to a link element in a second device (e.g., an IO device). The inbound channel conveys signals, or data, in the reverse direction, from the link element in second device to the link element in the first device.

In some systems, the components of the computer and the IO devices or IO slots may reside in different electromechanical enclosures, or "chassis". For example, the processors and memory of a computer may reside in (or, be "packaged" within) a system enclosure and IO devices or IO slots may reside in (or, be "packaged" within) an IO expansion enclosure (or, "IO drawer"). In such a system, the computer (e.g., a processor or memory within the computer) may be connected to the IO devices or slots by means of one or more cables. For example, a PCIE link may be used to connect components of a computer in a system chassis to a PCIE slot, or a PCIE device, that may reside in an IO drawer that is a separate chassis from that of the system chassis. The PCIE link may be formed of two or more cables (e.g., ribbon, flex, or optical cables), and each cable may carry a subset of the lanes forming the PCIE link.

In a system employing multiple cables to form a single signaling link, each cable may be connected to connectors of each device, in which the connectors of each device collectively form the link at or within that device. For example, a computer may connect to PCIE slots or PCIE devices (e.g., a PCIE switch) in an IO drawer using a PCIE link formed of two or more cables. The computer may provide multiple such links, each link capable of connecting to a particular PCIE device or PCIE slot in an IO drawer. The computer may provide connectors corresponding to a particular instance of a link included in the computer, and the IO drawer may provide connectors corresponding to a particular instance of a link included in the IO drawer.

A problem may arise with multi-cable links in assuring that cables connected to a link (e.g., connectors corresponding to an instance of a link) included in one device all connect to the same link of a second device. For example, two cables may form a sixteen-lane PCIE link, with a "low byte" cable conveying the low order eight lanes (lanes zero to seven) and a "high byte" cable conveying the high order eight lanes (lanes eight to fifteen). A computer may provide two connectors associated with a particular instance of a PCIE link, one for the low byte cable, and one for the high byte cable. An IO drawer may correspondingly provide two connectors associated with a particular instance of a PCIE link, one for the low byte cable, and one for the high byte cable.

Correctly cabling the link requires connecting a cable from the low byte connector of the computer to the low byte connector of a particular link of the IO drawer. Similarly, the cable connected to the high byte connector of that same link of the computer must connect to the high byte connector of the same link of the IO drawer. However, it is possible that the connection may be made incorrectly, connecting a cable from the low byte connector of the computer to the high byte connector of the IO drawer, and vice versa.

A system may include multiple IO drawers, or multiple PCIE slots or devices in an IO drawer. It is possible, in such systems, that two cables connected to a computer may not be connected to the same IO drawer. For example, a computer may have two links—a "link one" and a "link two"—to connect to two IO drawers. Each link of the computer may have two connectors, one low byte, and one high byte. Similarly, each IO drawer may have two connectors, one low byte, and one high byte. It is possible to incorrectly connect a cable from the low byte connector of the computer link one to the low byte connection of the first IO drawer, and connect a second cable, from the high byte connector of the computer link one, to the high or low byte connector of the second IO drawer.

To aid in installing, operating, and servicing the computer firmware (or, software) operating in the computer, an IO device, or IO drawer may be designed to detect possible incorrect cable connections. The firmware may receive information, over each cable connected to a link of the computer, identifying a device, or a connector location of a device, connected to the cable (e.g., an IO drawer). The firmware may utilize lanes of the link, within the cable, or may utilize a sideband link in each cable, to determine the locations on an IO drawer to which each cable is connected. If the firmware cannot receive the information on a cable, or the information received on one cable does not match or agree with information received on another cable, it may be that the cables are not properly connected to the same link of another device (e.g., an IO drawer). Under such conditions it may not be possible, or may lead to incorrect function of the system, to allow the link to become operational.

One or more signaling lanes within a link, or within a sideband link, may not be operable both directions. For example, the outbound channel of a lane may be operable (signals transmitted out are received in at the other end) but the inbound channel may not also be operable. In such a case, information to determine connection locations may be transmitted in one direction but not the other. For example, a request for information may be transmitted on the outbound channel, but the inbound channel may not be operable to return the information. The firmware may not be able, then, to receive that information and may not be able, then, to determine whether the cable that includes that partially operable lane is connected to the same link of a device as other cables connected to the same link of the computer.

Accordingly, features of the present disclosure enable using signaling in only one direction of a lane forming a link (e.g., a PCIE or a sideband link) within a cable to determine that the cable is connected to a remote location associated with a link that connects, at the remote end, other cables forming that same link. For purposes of understanding the present disclosure a computer connecting to one or more IO drawers provides an example of a system connecting devices using multi-cable links. Embodiments may employ a variety of types of links (e.g., SAS, Fiber Channel, among those previously referenced). For purposes of further understanding the disclosure, the example links in the figures of the disclosure may be PCIE links having sixteen lanes, formed of a low byte and high byte cable, and interconnecting a computer and an IO drawer. However, it would be apparent to one of ordinary skill in the art that a variety of devices may be interconnected using multi-cable links, and the manner in which to apply the present disclosure to such other embodiments.

FIG. 1 illustrates an example computer system 100 having a computer 110 connecting to an IO drawer 120 using multi-cable links, LINK1 130 and LINK2 140. Each of the links utilizes a low and a high cable, LINK1 having high cable 130A and low cable 130B, and LINK2 having high cable 140A and low cable 140B. A link may be formed of a number of signaling lanes, and each cable forming a link may convey a subset of the totality of the lanes. The high cable may convey eight lanes forming the high-order byte of a sixteen-lane PCIE link, for example, and the low cable may convey eight lanes forming the low-order byte of that PCIE link.

Various embodiments may employ more than two cables to form a link. For example, a link may be a sixteen-lane PCIE link and may be formed of four cables, each conveying four of the sixteen lanes. In another example, a sixteen-lane link may be formed of 3 cables, in which one cable conveys 8 lanes (e.g., lanes zero to seven) and the other two cables each convey 4 lanes (e.g., lanes eight through eleven and lanes twelve through fifteen, respectively).

In an embodiment, devices connecting cables forming a link may provide connectors (or, connection locations) to connect the cables. The computer 110 provides connectors for each of the four cables that form LINK1 and LINK2. The computer CONNECTOR1 116A and CONNECTOR2 116B provide high and low connectors, respectively, for the LINK1 high and low cables. The computer CONNECTOR3 116C and CONNECTOR4 116D provide high and low connectors, respectively, for the LINK2 high and low cables. Similarly, the IO drawer 120 includes connectors for each cable. The IO drawer CONNECTOR1 126A and CONNECTOR2 126B provide high and low connectors, respectively, for the LINK1 cables. The IO drawer CONNECTOR3 126C and CONNECTOR4 126D provide high and low connectors, respectively, for the LINK2 cables.

Embodiments may couple the connectors to link modules and signals conveyed in the link cables may thereby be coupled to the link modules. The computer CONNECTOR1 and CONNECTOR2 are coupled to LINK MODULE1 112, and CONNECTOR3 and CONNECTOR4 are coupled to LINK MODULE2 114. Similarly, IO drawer CONNECTOR1 and CONNECTOR2 are coupled to IO drawer LINK MODULE1 122 and IO drawer CONNECTOR3 and CONNECTOR4 are coupled to IO drawer LINK MODULE2 124.

A link module, such as the computer 110 LINK MODULE1 and LINK MODULE2 and the IO drawer 120 LINK MODULE1 and LINK MODULE2, may include signaling apparatus, such as opto-electrical transceivers, where the cables are optical cables. A link module may include various status and control signals associated with the link, with lanes forming the link, with each connector, or with each cable. The status and control signals may include signals to enable and disable signal transmission, and may include status indicating signal reception, for one or more lanes included in the link.

An embodiment may include firmware, such as firmware 150 included in the computer 110, and in various embodiments the firmware may be in communication with link modules, such as the computer LINK MODULE1 and LINK MODULE2. The firmware may read status or set control signals in the link modules. For example, the firmware may set a "transmit enable" signal included in a link module to enable a lane of the link to transmit signals. The firmware may read a "signal received" status signal included in a link module to determine that signals are received on a lane of the link.

The firmware may also operate to manage the links. For example, the firmware may determine operability of the links and may initialize or enable signal transmission on the links. The firmware may determine the connectors (or, connection locations) at an IO drawer that connect to cables forming a particular link of the computer (e.g., cables connected to the computer CONNECTOR1 and CONNECTOR2). The firmware may determine to enable signal transmission on the links according to whether or not the link is operable, or whether or not the cables forming the link are connected from the same link of the computer to the same link of an IO drawer.

A multi-cable link may require that cables forming a link from connectors corresponding to a particular link of one device connect to corresponding (e.g., high and low byte) connectors of a particular link of a second device. For example, the LINK1 high cable connects from the computer CONNECTOR1 (high byte of LINK1) to CONNECTOR1 of the IO drawer, corresponding to the high cable (high byte) connector of one link of the IO drawer. The LINK1 low cable connects from the computer CONNECTOR2 (low byte of LINK1) to the IO drawer CONNECTOR2 (low byte) of the IO drawer link that includes the IO drawer CONNECTOR1. Similarly, the LINK2 high cable and low cable connect the PCIE link high and low byte computer CONNECTOR3 and CONNECTOR4 to the respective PCIE high and low byte IO drawer CONNECTOR3 and CONNECTOR4.

An embodiment may include a management controller within an IO drawer, such as the management controller 160 included in the IO drawer 120. A management controller may be coupled to, or in communication with, a link module. For example, in FIG. 1 the management controller 160 is coupled to the IO drawer link modules LINK MODULE1 and LINK MODULE2. A management controller may, in an embodiment, be able to access status and control signals within the link modules. Also, in an embodiment, a management controller may receive or send data by means of the lanes coupled to a link module, or by means of status and control signals within the link modules.

Figure 2A:
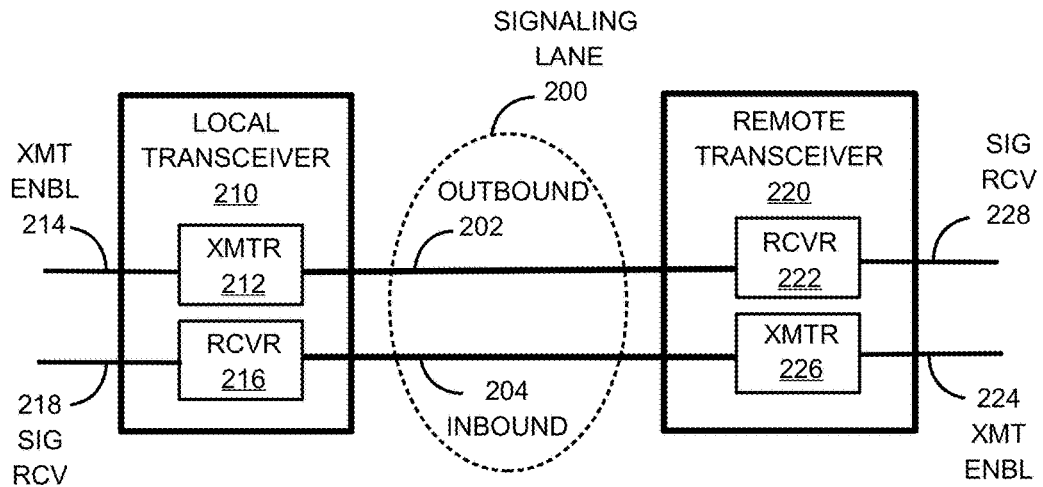
FIG. 2A is a block diagram illustrating a signaling lane within a cable included in a multi-cable link, according to features of the disclosure.

FIG. 2A illustrates an example signaling lane 200 that may be included in a link, according to aspects of the disclosure. Using the example of a sixteen-lane PCIE link, a multi-cable PCIE link may be formed of two cables, each having eight signaling lanes conveying one byte of PCIE data. In FIG. 2A, as a frame of reference, one end of a lane within a link is designated as "local" and the other end is designated as "remote". In an embodiment, for example, the local end of a PCIE link may be a computer, and the remote end of a PCIE link may be an IO drawer.

A signaling lane may be formed with signal "channels" conveying signals in one direction or the other. The signaling lane 200 is formed with two signal channels, an outbound channel 202, and an inbound channel 204, where (for purposes of illustration) "outbound" and "inbound" are relative to the local end of the lane.

In embodiments signal transmission and reception on the channels may be by means of transceivers. A transceiver may include a transmitter to send signals on a channel (e.g., an outbound channel), and may include a receiver to receive signals on a channel (e.g., an inbound channel). A transceiver may include a control signal to enable or disable sending signals on a channel. A transceiver may include a status signal to signify receiving signals on a channel.

For example, local transceiver 210 provides for signal transmission and receipt on each channel at the local end of the lane 200, having a signal transmitter 212 and a signal receiver 216. The transmitter sends signals on the outbound channel from the local transceiver to the remote transceiver. The transmitter includes an input control signal XMT ENBL (transmit enable) 214, to enable or disable transmission on the outbound channel. The receiver receives signals on the inbound channel transmitted from the remote transceiver. The receiver includes an output status signal, SIG RCV (signal received) 218, which indicates receiving signals on the inbound channel.

The signaling lane 200 is connected at the remote end to a remote transceiver 220, which includes a receiver 222 and a transmitter 226. The remote transceiver operates similarly to the local transceiver. The remote receiver receives signals on the outbound channel transmitted from the local transceiver and SIG RCV 228 is an output status signal that indicates receiving signals on that outbound channel. The transmitter 226 transmits signals on the inbound channel from the remote transceiver to the local transceiver. The XMT ENBL 224 is an input control signal to enable or disable the transmitter sending signals on the inbound channel.

In some embodiments, a signaling lane may be an optical fiber in a cable, and an embodiment may include opto-electronic transceivers, such as the local and remote transceivers in FIG. 2A embodied as opto-electronic transceivers.

Figure 2B:
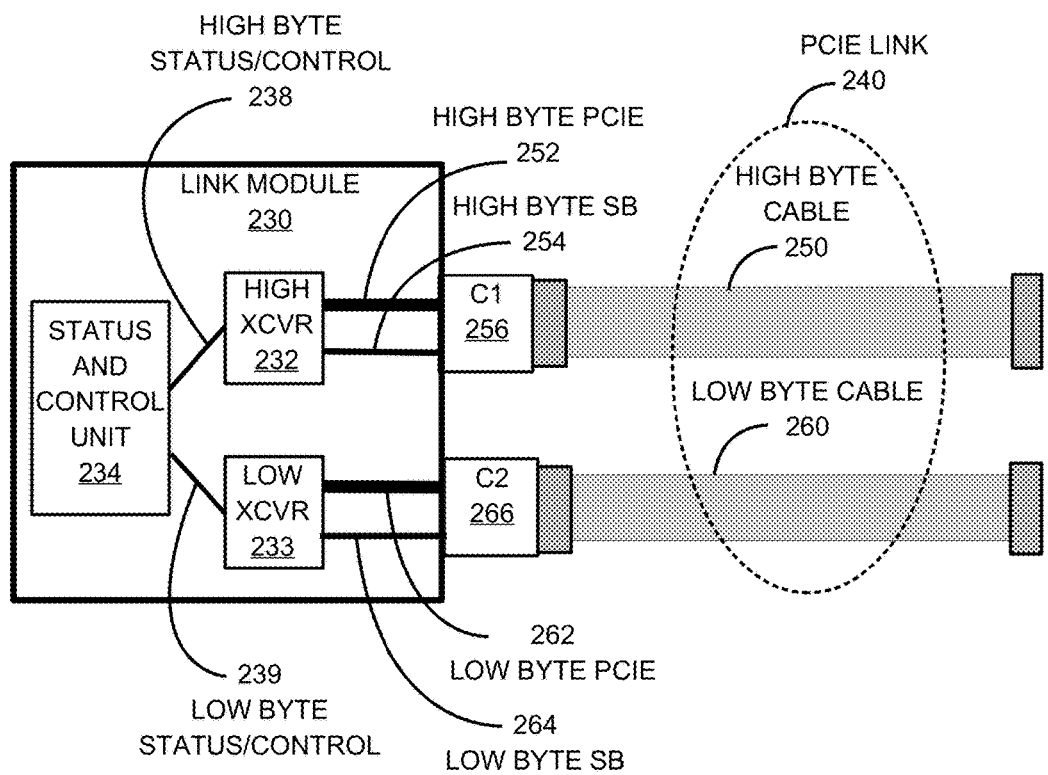
FIG. 2B is a block diagram illustrating a multi-cable link and a link module, according to features of the disclosure.

FIG. 2B illustrates an example multi-cable link and link module, according to features of the disclosure. PCIE link 240 is formed of two cables, a high byte cable 250 and a low byte cable 260. The high byte cable conveys lanes eight to fifteen of the PCIE link, shown as high byte PCIE 252, and mates to connector C1 256. The low byte cable conveys lanes zero to seven of the PCIE link, shown as low byte PCIE 262, and mates to connector C2 266. In embodiments, the cables may be fiber-optic cables, and each cable may include individual fibers, in which each fiber conveys one channel (e.g., an inbound or an outbound channel) of one lane included in a cable.

The connectors may couple the lanes within a cable to transceivers, such as the local and remote transceivers disclosed in FIG. 2A. For purposes of understanding the disclosure of FIG. 2B, "outbound" and "inbound" are with reference to the end of the cable connected to the link module 230. The link module includes a high byte transceiver 232 and a low byte transceiver 233. The high byte transceiver transmits eight lanes of PCIE outbound channel signals and receives eight lanes of PCIE inbound channel signals, forming the high byte of the PCIE link 240. The low byte transceiver also transmits eight lanes of PCIE outbound channel signals and receives eight lanes of PCIE inbound channel signals, forming the low byte of the PCIE link.

A link module may include a status and control unit such as status and control unit 234 included in the link module 230. The status and control unit may receive "signal received" status or may provide "transmit enable" controls, such as disclosed in FIG. 2A, and the signal received status or transmit enable controls may be included for each of the lanes in the high and low byte transceivers. In FIG. 2B the status and control unit receives high byte status/control 238 from the high transceiver and receives low byte status/control 239 from the low transceiver.

In some embodiments a cable may include a sideband link. As shown in FIG. 2B the high byte cable includes the sideband link 254 and the low byte cable includes the sideband link 264. In embodiments a sideband link may be a single signaling lane, or may be formed of multiple signaling lanes. A sideband link may be coupled to a link module status and control unit, and may convey status, such as signal received, for any lane of the PCIE link. A sideband link may access control signals, such as a transmit enable, for any lane of the PCIE link.

In some embodiments, a sideband link in one cable may act as an alternative communications path to a sideband link in another cable. For example, the high byte sideband link may be a primary path to access, from the local end of the link, signal received status in a remote link module. The low byte sideband link may be a backup path to access the status, from the local end of the link, if, for example, the high byte sideband link is not operable in one or both directions.

In embodiments a transceiver, such as the high and low transceivers of FIG. 2B, may, in some phases of operating a lane, transmit a continuous stream of signals. A status and control unit may be coupled to a local or remote end of the lane and may include signal received status representing that the stream is being properly received on that lane (or, an inbound or outbound channel included in that lane). For example, a sequence of signals may form a "training packet." A transceiver may transmit, on an outbound channel of the lane, a continuous sequence of training packets, such as during link initialization or reset periods. A signal received on the inbound end of a lane may represent that the training sequence is properly received on that inbound channel. In embodiments a sideband lane may be used to read, from a local end of a link, signal received status for that or other lanes recorded in a status and control unit included in a remote link module connected to that sideband lane.

Figure 3:
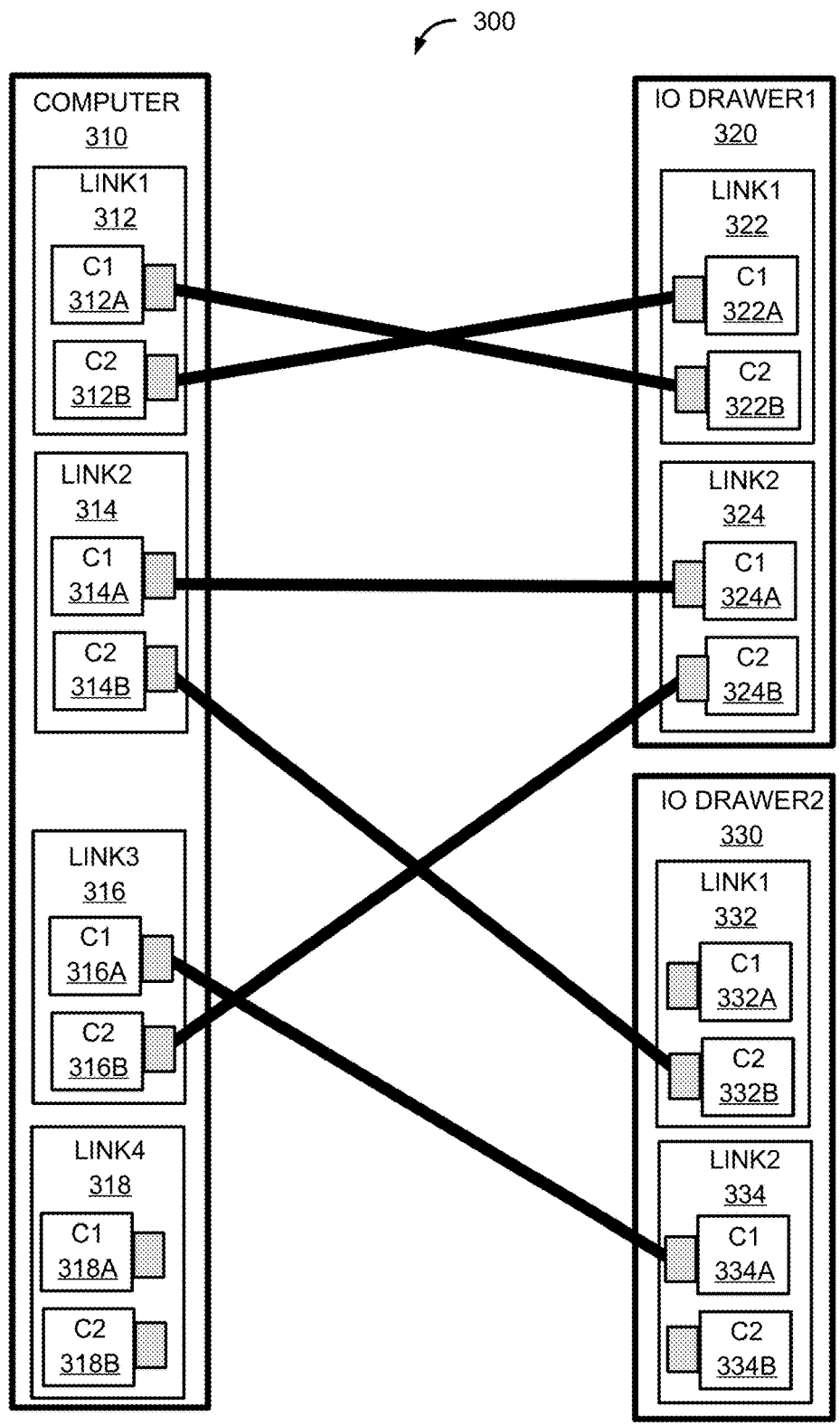
FIG. 3 is a block diagram illustrating example cable connections between devices in a system using multi-cable links, according to aspects of the disclosure.

Individual cables forming a multi-cable link may be incorrectly connected between a local device link (e.g., a component of a computer) and a remote device link (e.g., a component of an IO drawer). FIG. 3 illustrates various such incorrect cable connections. In FIG. 3 an example computer system 300 includes a computer 310 connected to two IO drawers, IO DRAWER1 320 and IO DRAWER2 330. The computer 310 includes four links: LINK1, LINK2, LINK3, and LINK4 (312, 314, 316, and 318, respectively). Each of the IO drawers includes two links; IO DRAWER1 includes LINK1 322 and LINK2 324, and IO DRAWER2 includes LINK1 332 and LINK2 334. Following the example of FIG. 1, and for purposes of illustration, the links may be PCIE links, and each link may be formed using a high byte and a low byte cable.

Each link of the computer and the IO drawers includes two connectors: one connector to attach (or, connect) the high byte cable of the example PCIE link, and one connector to attach the low byte cable of the PCIE link. For purposes of illustrating feature of the disclosure, and in embodiments, a connector may be an electromechanical device to which a cable mates. In another embodiment, a connector may be another form of physical interface to which a cable may be connected. In FIG. 3, "C1" of each link corresponds to a connector to connect the high byte cable of a link and "C2" of each link corresponds to a connector to connect the low byte cable of the same link.

For example, C1 312A is the computer LINK1 high byte cable connector and C2 312B is the computer LINK1 low byte cable connector. Similarly, for LINK2, LINK3, and LINK4 of the computer, the C1 connectors (314A, 316A, and 318A) connect the high byte cable of each of the links and the C2 connectors (314B, 316B, and 318B) connect the low byte cable forming each of the same links, respectively. Similarly, with respect to the IO drawers, C1 322A is the IO DRAWER1 LINK1 high byte cable connector and C2 322B is the IO DRAWER1 LINK1 low byte cable connector. For IO DRAWER1 LINK2 (324), and IO DRAWER2 LINK1 and LINK2 (332 and 334, respectively), the C1 connectors (324A, 332A, and 334A) of each of the links connect the high byte cable of the link. The IO DRAWER1 and IO DRAWER2 C2 connectors (324B, 332B, and 334B) of each of the links connect the low byte cable forming each of the same links, respectively.

FIG. 3 illustrates various improper connections of the cables forming a link connected between the computer and IO drawers one and two. Beginning with the computer LINK1 (312), the computer LINK1 C1 high byte improperly connects to the IO DRAWER1 LINK1 C2 low byte. Similarly, the computer LINK1 C2 low byte improperly connects to the IO DRAWER1 LINK1 C1 high byte.

Computer LINK2 (314) illustrates another improper connection. The computer LINK2 C1 high byte connects to the IO DRAWER1 LINK2 C1 high byte location. However, the computer LINK2 C2 low byte improperly connects to the IO DRAWER2 LINK1 C2 low byte, improperly dividing the computer LINK2 between IO DRAWER1 LINK2 and IO DRAWER2 LINK1.

Computer LINK3 (316) similarly illustrates an improper connection of the computer LINK3 high and low bytes to different IO drawers. The LINK3 C1 high byte connects to the IO DRAWER2 LINK2 C1 high byte. However, the LINK3 C2 low byte connects to the IO DRAWER1 LINK2 C2 low byte, improperly dividing the computer LINK3 between IO DRAWER1 LINK2 and IO DRAWER2 LINK2.

Cable connections such as illustrated in FIG. 3 may create inoperable links. For example, cross-connecting the low and high bytes of computer LINK1 and IO DRAWER1 LINK1 may result in a PCIE link that is unable to train (i.e., establish lane order and lane clocking within the link). The connection of the cables forming the computer LINK2 may result in computer LINK2 training the LINK2 low byte with the IO DRAWER1 low byte. However, the computer LINK2 high byte may, consequently, not train, or may train out of sync with the computer LINK2 low byte (and, thereby, may render the LINK2 high byte unusable). The connection (to links of different IO drawers) of the cables forming the computer LINK3 may result in a similar, incorrectly trained, state of a PCIE link.

In embodiments, an element, or component, of a device connected by a multi-cable link to a second device may determine the identity of the second device, or a connector location on the second device, to which a cable is connected. For example, the computer 310 may include firmware operating to enable or manage PCIE links to the IO drawers (320 and 330). As part of enabling the PCIE links, or in other operations of the computer, the firmware may acquire (e.g., read, or otherwise receive) information from the IO drawer to which a cable is connected. The information may identify the IO drawer, or may identify a location on the IO drawer, to which the cable is connected. The firmware may acquire the information uniquely via each cable and may use the information to determine that all cables connected to the same link of the computer (e.g., computer LINK1) also connect to the same link of the IO drawer (e.g., IO DRAWER1 LINK1).

In some embodiments, to acquire the information the firmware may use signaling lanes, such as illustrated in FIG. 2A within a cable. A signaling lane may be a lane, or lanes, of a PCIE or sideband link (where a sideband link is included in the cable). The firmware may use a signaling lane of a link to access status and control information within a link module in the IO drawer, such as the link module 230 of FIG. 2B. The link module may include status and control information, such as a transmit enable or signal received status, associated with all cables connected to a particular link of the IO drawer.

Acquiring the information from the IO drawer may require that both the outbound and inbound directions of the signaling lane be operable. For example, the firmware may need to send a command or request, utilizing the outbound (from the computer) channel of a lane, to a component of an IO drawer (e.g., a link module such as illustrated in FIG. 2B). That component of the IO drawer may then transmit, utilizing the inbound (to the computer) channel of the lane, the identifying information to the firmware.

In another embodiment, the firmware may read information from a component of the IO drawer (e.g., a link module) and may use the outbound channel of the lane to transmit, for example, the address of a register, or an enabling signal, to a component of the IO drawer from which to read the information. The IO drawer may use an inbound channel of the lane to transmit the information to the computer.

In some circumstances, a lane may be operable in only one direction—inbound or outbound, but not both. Various embodiments may use a plurality of lanes to acquire information from a remote device (e.g., an IO drawer) and, in such embodiments if the outbound, or the inbound, channel of any one such lane is not operable then the lanes, collectively, may not be operable in the corresponding direction. A lane, or lanes, that are operable in only one direction may render a remote device, or status and control information of that lane, inaccessible via that lane. Consequently, information uniquely identifying the remote device, or cable connection location, may not be obtainable via the cable conveying that lane. It may not be possible, under such circumstances, to then determine from the local device (e.g., a computer) that the cable is connected to the same link of the remote device as other cables connected to the same link of the local device.

Figure 4:
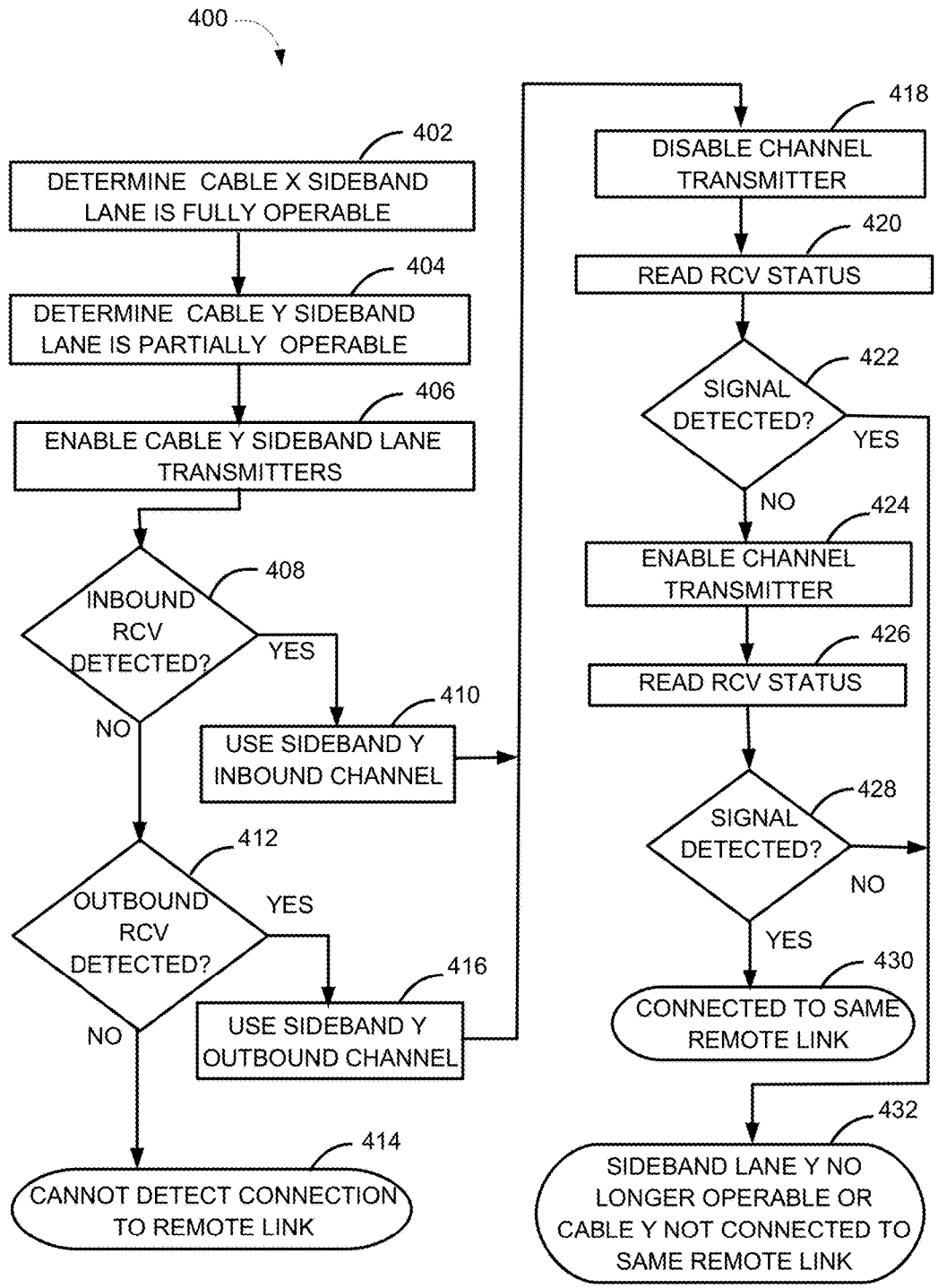
FIG. 4 is a flowchart illustrating an example method for determining cable connections.

According to features of the disclosure, FIG. 4 illustrates an example method 400 to determine that the cables connected to a particular local device link connect to the same link of a remote device, in the case that a lane in one cable is operable in only one direction (e.g., inbound but not outbound). The method illustrates using a fully operable lane in one cable, and the operable direction of a partially operable lane in another of the cables, to make the determination.

For purposes of illustration, a computer is representative of a local device and an IO drawer is representative of a remote device. However, it would be evident to one of ordinary skill in the art that "local" and "remote" are designations to identify a frame of reference, and that a device at either end of a link may be considered either local or remote. It would be further evident to one of ordinary skill in the art that a local or a remote device may be a device other than a computer or an IO drawer, and may, in fact, be any type of device connected by a multi-cable link to another type of device. It would be still more evident to one of ordinary skill in the art that the method may be performed by either of the devices connected to a link, and that the method may be performed using lanes of a link other than a sideband lane, including a plurality of sideband or other lanes in a link.

To further illustrate features of the disclosure, the computer may have a PCIE link—"Computer Link One"— formed of a high and low cable for connecting to a PCIE link of the IO drawer. Firmware operating in the computer may perform the method 400 to determine that the cables connected to Computer Link One connect to the same link of the IO drawer, for example "IO Drawer Link One". "Cable X" may be connected to the low byte connector of Computer Link One and "cable Y" may be connected to the high byte connector of Computer Link One.

Further, for purposes of understanding aspects of the disclosure, cables X and Y may each include a sideband link formed of a single sideband lane, such as that disclosed in FIG. 2A. It would be evident, however, to one of ordinary skill in the art that the method may be performed using lanes of a link other than a sideband link (e.g., the PCIE link), or using a plurality of sideband or other lanes included in a cable.

The computer may include a link module, such as disclosed in FIG. 2B, coupled to Computer Link One. The IO drawer may, similarly, include a link module, such as disclosed in FIG. 2B, coupled to IO Drawer Link One. The link modules may include transceivers, such as disclosed in FIG. 2A, to enable outbound signal transmission and to detect signal reception on the sideband lane of each of cables X and Y. The link module coupled to IO Drawer Link One may further be configured to allow access to both the high and low cable sideband lane transceivers using either the cable X or cable Y sideband lanes. Firmware may thereby access sideband lane transceiver signals of IO Drawer Link One low cable using the sideband lane in the high byte cable, and vice versa.

According to features of the disclosure, at 402 the firmware selects Computer Link One and determines that the sideband lane of cable X is fully operable. A sideband lane may be fully operable if the lane is operable in both (inbound and outbound) directions. A sideband lane may be partially operable if the lane is operable in only one direction (e.g., signals are received on the inbound channel of the lane, but not on the outbound channel). In embodiments a link module may include a status and control unit, and the status and control unit may provide an indication that a sideband lane is fully operable or that the sideband lane is only partially operable. The firmware may use the indication from a status and control unit to determine that cable X is fully operable. The status and control unit may be included in the local device link, or may be included in the remote device link, or may be included in both and the firmware may use indications from both units to determine the operable status of a sideband lane.

In an embodiment, and for purposes of illustration in the present example, a remote device may be configured to enable a fully operable sideband lane in another cable, such as the sideband lane of cable X, to access status and control signals in a link module, and to perform 406 through 428 of the method. In an alternative embodiment, an interconnection or signaling link, separate from the sideband lanes, or separate from a multi-cable link, may be used access remote status and control signals and to perform 406 through 428. For example, a computer may access link status and control signals in an IO drawer by means of a cable or cables independent of the multi-cable link, or by means of a network connection (e.g., Ethernet or wireless) between the computer and the IO drawer.

At 404, the firmware determines that cable Y is also connected to Computer Link One, and that the sideband lane included in cable Y is operable in only one direction and so is partially operable. A link module may indicate that a sideband lane is only partially operable, and may not further indicate in which direction the lane is operable (or, alternatively, not operable). At 404, a link module coupled to Computer Link One, or coupled to IO Drawer Link One, may indicate which of the sideband lane Y channels is operable. The firmware may, accordingly, select the operable channel of the cable Y sideband lane so indicated to utilize at 418 through 428. In an alternative embodiment, firmware may perform 406 through 416 of the method to determine in which direction cable Y sideband lane (hereinafter, sideband lane Y) is operable, and to then select a channel of the cable Y sideband lane to utilize at 418 through 428.

At 406 the firmware enables signal transmission on each of the inbound and outbound channels of the sideband lane Y. In an embodiment a status and control unit, in the manner of that disclosed in FIG. 2B, may include transceivers, such as disclosed in FIG. 2A, for each of the lanes in cable X and Y. The transceivers may include signal received status on a lane, or may include a transmit enable to enable or disable signal transmission on a lane. The status and control unit may include signal received status or transmit enable for all lanes connecting to a particular link (e.g., PCIE or sideband link) included in cables.

The firmware may use the status and control unit transmit enable and signal received signals to perform the method. To enable sideband lane Y outbound channel transmission, for example, the firmware may use a transmit enable signal coupled to the computer link connecting cable Y. Similarly, to enable sideband lane Y inbound channel transmission, the firmware may, for example, use a transmit enable signal coupled to the IO drawer link connecting cable Y. The firmware may use the fully operable sideband lane of cable X (hereinafter, sideband lane X), to access status and control signals associated with the IO drawer link, and to thereby enable signal transmission on the sideband lane Y inbound channel (from the IO drawer to the computer).

At 408, the firmware determines if the signal enabled at 406 is received at the computer on the sideband lane Y inbound channel. If the signal is received, the sideband lane Y inbound channel is operable and at 410 the firmware selects the sideband lane Y inbound channel to utilize at 418 through 428. If the signal is not received, at 412 the firmware determines if the signal enabled on the sideband lane Y outbound is received at the IO drawer link connection intended to connect cable Y. If the signal on the sideband lane Y outbound channel is not detected at the IO drawer, at 414 the firmware determines that it cannot use the method to determine that cable Y is connected to the same IO drawer link, IO Drawer Link One, as cable X. If, on the other hand, at 412 the firmware determines that the signal transmitted on the sideband lane Y outbound channel is received at the link module coupled to IO Drawer Link One, the firmware, at 416, selects the sideband lane Y outbound channel to utilize at 418 through 428.

At 418 the firmware disables signal transmission on the sideband lane Y channel selected at 410 or 416. At 420 the firmware reads receive status for the selected sideband lane Y channel to determine if, in response to disabling signal transmission at 418, the signal transmission is no longer received on that channel. For example, if using the sideband lane Y inbound channel, the firmware disables signal transmission on that channel at the link module coupled to IO Drawer Link One sideband lane Y transmitter. The firmware then reads the sideband lane Y inbound receive status in the link module coupled to Computer Link One to determine if the signal is no longer received. Conversely, if using the sideband lane Y outbound channel, the firmware disables signal transmission on that channel at the link module coupled to Computer Link One sideband lane Y transmitter. The firmware then reads the sideband lane Y outbound receive status in the link module coupled to IO Drawer Link One to determine if the signal is no longer received.

At 422, the firmware determines whether a signal continues to be received on the selected sideband channel Y. If the firmware determines that a signal continues to be received, the signal received must be transmitted from a sideband lane of a cable other than cable Y. Correspondingly, at 432, the firmware determines that cable Y is not connected to IO Drawer Link One. The firmware may, alternatively, determine that the sideband channel Y is no longer operable; for example, the sideband channel Y transmitter, or the sideband channel Y receiver, may have failed (e.g., the sideband channel Y continues to transmit, or the receiver continues to indicate signal received, after disabling transmission at 418). The firmware, at 432, completes performing the method. Completing performing the method, at 432, may include the firmware disabling transmission on all lanes of Computer Link One, or IO Drawer Link One, or both links.

If, at 422, if the firmware determines that a signal is no longer received, the firmware may determine that cable Y is connected to IO Drawer Link One (at the low byte connection of IO Drawer Link One) and may conclude the method (not shown) at 430. Alternatively, the firmware may, at 424 through 428, re-enable transmission on the sideband channel Y to further verify operability of the channel and the cable connection. Correspondingly, at 424, the firmware enables signal transmission on the selected sideband lane Y channel. At 426 the firmware reads receive status for the selected sideband lane Y channel to determine if the signal transmission is now received on that channel.

At 428 the firmware determines whether a signal is received on the sideband channel Y. If the firmware determines that no signal is received, the firmware may determine that the sideband channel Y has become inoperable (e.g., the channel Y transmitter is failing to transmit, or the receiver is failing to indicate signal received, after enabling transmission at 424). Alternatively, the firmware may determine that cable Y is no longer connected to IO Drawer Link One low cable connection. Correspondingly, the firmware, at 432, completes performing the method. Completing performing the method, at 432, may include the firmware disabling transmission on all lanes of Computer Link One, or IO Drawer Link One, or both links.

If the firmware, at 428, determines that a signal is received, the firmware may determine at 430 that cable Y is connected to the high byte location of IO Drawer Link One and completes performing the method. Completing performing the method, at 430, may include the firmware enabling transmission on all lanes of Computer Link One or IO Drawer Link One, or both, and may further include initializing the link for operational communications.

Figure 5:
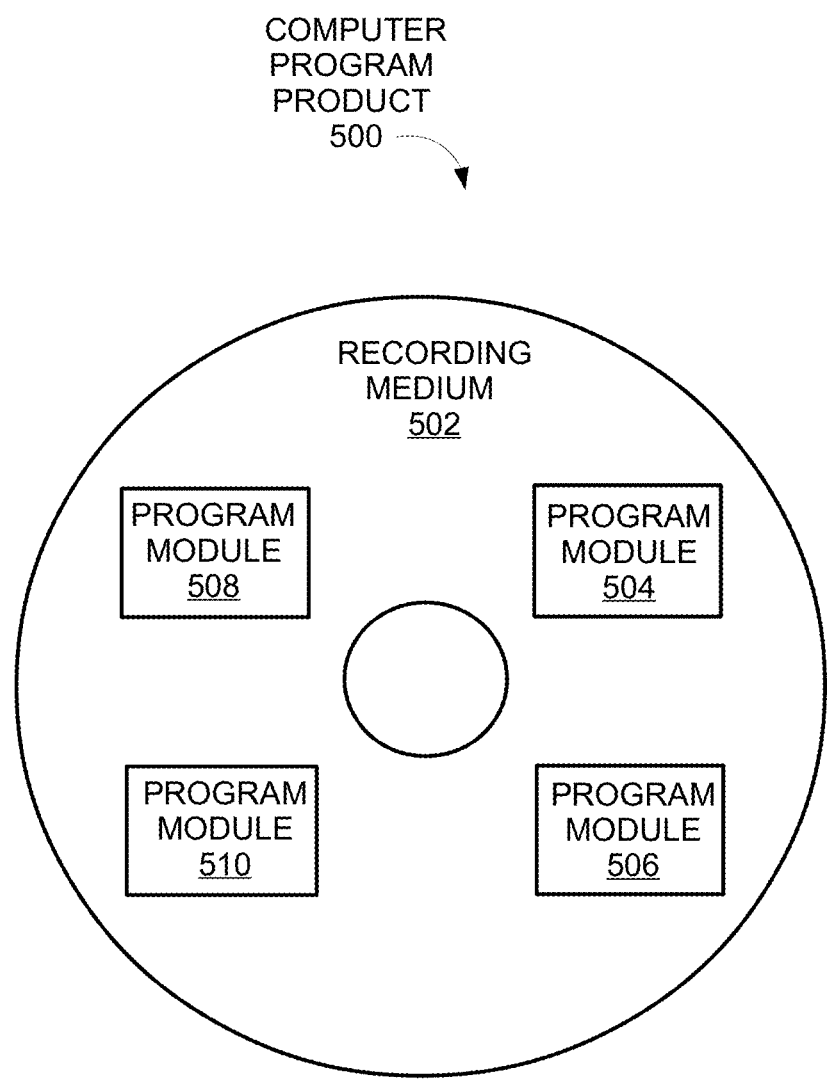
FIG. 5 is a block diagram illustrating a computer program product, according to aspects of the disclosure.

FIG. 5 depicts an article of manufacture or computer program product 500 that is an embodiment of the invention. The computer program product 500 may include a recording medium 502, and the recording medium 502 may store program modules 504, 506, 508, and 510 for a computer to carry out the aspects of the invention. The recording medium 502 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 504, 506, 508, or 510 may direct a computer to implement the aspects of the invention including, but not limited to, the structures and operations illustrated and described in the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The invention claimed is:

1. A method for determining cable connections between a first chassis and a second chassis, the method comprising:
    determining, by the first chassis, the first chassis containing a processor and a memory, that a first cable is connected to a first link of the first chassis;
    determining, by the first chassis, that the first cable is also connected to a second link of a first input-output drawer of the second chassis;
    determining, by the first chassis, that a second cable is connected to the first link of the first chassis, the second cable including a first signaling lane, the first signaling lane including a first outbound channel and a first inbound channel;
    receiving, by the first chassis, a first status signal through an independent connection between the first chassis and the second chassis, wherein the independent connection is separate from the first cable and the second cable;
    determining, by the first chassis and based on the first status signal, that at least one of the first inbound channel and the first outbound channel is inoperable;
    sending, by the first chassis, through the independent connection, and in response to the determining that at least one of the first inbound channel and the first outbound channel is inoperable, a control signal to the second chassis, the control signal configured to cause the second chassis to send an inbound signal transmission on the first inbound channel to the first link of the first chassis;
    determining, by the first chassis, that the inbound signal transmission is not received on the first inbound channel by the first link of the first chassis;
    sending, by the first chassis and in response to the determining that the inbound signal transmission is not received, an outbound signal transmission on the first outbound channel to the second chassis;
    receiving, by the first chassis, via the independent connection, and in response to the outbound transmission signal, a second status signal;
    determining, by the first chassis and based on the second status signal received, that the outbound signal transmission was received on the first outbound channel by the second chassis;
    determining, by the first chassis and based on the inbound signal transmission not being received and the outbound signal transmission being received, that the first outbound channel is operable and that the first inbound channel is inoperable;
    disabling, in response to the determining that the first inbound channel is inoperable, signal transmission on the first outbound channel;
    receiving, by the first chassis, via the first cable, and in response to the disabling the signaling transmission, a third status signal;
    determining, by the first chassis and based on the third status signal, that the disabling of signal transmission on the first outbound channel was detected by the second link of the first input-output drawer of the second chassis; and
    determining, by the first chassis and based on the receiving the third status signal through the first cable, that the second cable connects the first link of the first chassis to the second link of the first input-output drawer of the second chassis rather than a link of a second input-output drawer of the second chassis.

2. The method of claim 1, wherein the independent connection is a wireless network connection.

3. The method of claim 1, wherein the independent connection is an Ethernet cable.

4. The method of claim 1, wherein the independent connection is a physical cable.

5. The method of claim 1, wherein the first link is a Fiber Channel link.

6. The method of claim 1, wherein the first link is a PCI-Express link.

7. A system for determining cable connections between a first device and a second device without the use of an identifier, the system comprising:
    the first device;
    the second device; and
    a processor in communication with the first device, wherein the processor is configured to perform a method, the method comprising:
        determining that a first cable is connected to a first Fiber Channel link of the first device;
        determining that the first cable is also connected to a second Fiber Channel link of a first input-output drawer of the second device;
        determining that a second cable is connected to the first Fiber Channel link of the first device, the second cable including a first signaling lane, the first signaling lane including a first outbound channel and a first inbound channel;
        receiving a first status signal through an Ethernet cable between the first device and the second device;
        determining, based on the first status signal, that at least one of the first inbound channel and the first outbound channel is inoperable;
        sending, through the Ethernet cable, and in response to the determining that at least one of the first inbound channel and the first outbound channel is inoperable, a control signal to the second device, the control signal configured to cause the second device to send an inbound signal transmission on the first inbound channel to the first Fiber Channel link of the first device;

determining that the inbound signal transmission is not received on the first inbound channel by the first Fiber Channel link of the first device;

sending, in response to the determining that the inbound signal transmission is not received, an outbound signal transmission on the first outbound channel to the second device;

receiving, via the Ethernet cable, and in response to the outbound transmission signal, a second status signal;

determining, based on the second status signal received, that the outbound signal transmission was received on the first outbound channel by the second device;

determining, by the first device and based on the inbound signal transmission not being received and the outbound signal transmission being received, that the first outbound channel is operable and that the first inbound channel is inoperable;

disabling, in response to the determining that the first inbound channel is inoperable, signal transmission on the first outbound channel;

receiving, via the first cable, and in response to the disabling the signaling transmission, a third status signal;

determining, based on the third status signal, that the disabling of signal transmission on the first outbound channel was detected by the second Fiber Channel link of the first input-output drawer of the second device; and determining, based on the receiving the third status signal through the first cable, that the second cable connects the first Fiber Channel link of the first device to the second Fiber Channel link of the first input-output drawer of the second device rather than a link of a second input-output drawer of the second device.

8. A computer program product for performing a method for determining cable connections, the computer program product comprising a computer readable storage medium having program instructions embodied therewith, the program instructions executable by a computer to perform a method comprising:

determining that a first cable is connected to a first Fiber Channel link of the first device;

determining that the first cable is also connected to a second Fiber Channel link of a first input-output drawer of the second device;

determining that a second cable is connected to the first Fiber Channel link of the first device, the second cable including a first signaling lane, the first signaling lane including a first outbound channel and a first inbound channel;

receiving a first status signal through an Ethernet cable between the first device and the second device;

determining, based on the first status signal, that at least one of the first inbound channel and the first outbound channel is inoperable;

sending, through the Ethernet cable, and in response to the determining that at least one of the first inbound channel and the first outbound channel is inoperable, a control signal to the second device, the control signal configured to cause the second device to send an inbound signal transmission on the first inbound channel to the first Fiber Channel link of the first device;

determining that the inbound signal transmission is not received on the first inbound channel by the first Fiber Channel link of the first device;

sending, in response to the determining that the inbound signal transmission is not received, an outbound signal transmission on the first outbound channel to the second device;

receiving, via the Ethernet cable, and in response to the outbound transmission signal, a second status signal;

determining, based on the second status signal received, that the outbound signal transmission was received on the first outbound channel by the second device;

determining, by the first device and based on the inbound signal transmission not being received and the outbound signal transmission being received, that the first outbound channel is operable and that the first inbound channel is inoperable;

disabling, in response to the determining that the first inbound channel is inoperable, signal transmission on the first outbound channel;

receiving, via the first cable, and in response to the disabling the signaling transmission, a third status signal;

determining, based on the third status signal, that the disabling of signal transmission on the first outbound channel was detected by the second Fiber Channel link of the first input-output drawer of the second device; and determining, based on the receiving the third status signal through the first cable, that the second cable connects the first Fiber Channel link of the first device to the second Fiber Channel link of the first input-output drawer of the second device rather than a link of a second input-output drawer of the second device.

* * * * *